(No Model.)
J. J. HOPPES.
FEED WATER HEATER.
No. 318,112. Patented May 19, 1885.
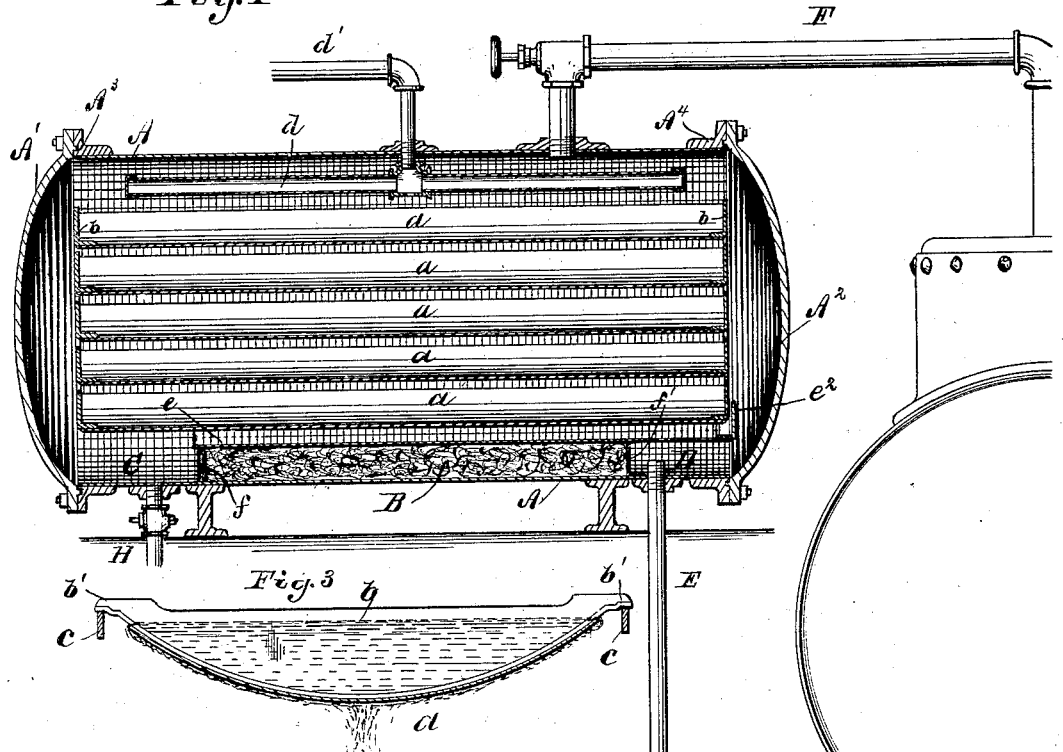
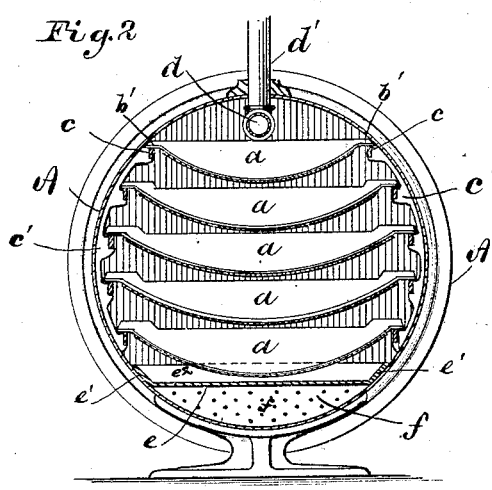
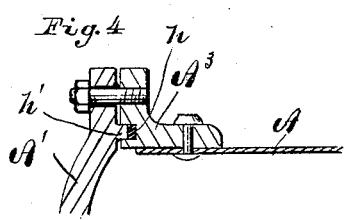
Attest
G. H. Carnahan
P. J. Clevenger
Inventor
John J. Hoppes
By Paul A. Staley
Atty.

UNITED STATES PATENT OFFICE.

JOHN J. HOPPES, OF SPRINGFIELD, OHIO.

FEED-WATER HEATER.

SPECIFICATION forming part of Letters Patent No. 318,112, dated May 19, 1885.

Application filed February 17, 1885. (No model.)

*To all whom it may concern:*

Be it known that I, JOHN J. HOPPES, a citizen of the United States, residing at Springfield, in the county of Clark and State of Ohio, have invented a certain new and useful Improvement in Feed-Water Heaters and Lime-Extractors, of which the following is a specification.

My invention relates to feed-water heaters, filters, and lime-extractors for steam-boilers.

The object of my invention is to provide a heater particularly adapted for filtering and extracting the lime from the feed-water of steam-boilers; and my invention consists in a series of longitudinal troughs placed one above another in an outer shell or casing, said troughs being so formed that the water which is received thereby will flow over the sides thereof and in a thin and uniform sheet along the bottom or outer surface of said trough in direct contact with the steam in the said heater, whereby the water will become thoroughly heated and the lime and other incrustating substances be separated therefrom and deposited on the bottom of said troughs.

My invention further consists in the combinations and constructions of parts hereinafter described and claimed.

In the accompanying drawings, Figure 1 is a vertical longitudinal sectional view of a heater embodying my invention, shown connected to a steam-boiler. Fig. 2 is a transverse sectional elevation of the same. Fig. 3 is a transverse sectional view of one of the troughs removed, and Fig. 4 is a detailed view of a portion of the heater-head in section.

Like parts are indicated by similar letters of reference throughout the several views.

In the said drawings, A represents the outer casing or shell of the heater, which consists, preferably, of a plain horizontal metallic cylinder of considerable length, provided at each end with suitable covers or heads, A' A², adapted to be removed therefrom.

Extending longitudinally through the cylinder A is a series of troughs, *a a*, &c., which are arranged one above the other, and are closed at each end by suitable end pieces, *b*, which extend above the sides of the troughs. The end pieces, *b*, are each provided at either side with a projection, *b'*, adapted to rest on supporting rods or ways *c*, which extend longitudinally along each side of the casing A. The rods or ways *c* on each side of the casing are all secured to supporting-brackets *c'*, which are in turn secured to the outer casing, A. The troughs *a a*, &c., are adapted to slide longitudinally on these rods or ways *c*, and, when one or both of the heads A' A² are removed, may be readily withdrawn from or slipped into the cylinder A. Immediately above the upper trough is a perforated supply-pipe, *d*, extending longitudinally along the top of the cylinder and provided with a series of perforations in the bottom thereof. This pipe *d* is connected by a suitable inlet-pipe, *d'*, to the pump or other source of water-supply. Immediately under the lower trough *a*, I provide a removable horizontal plate, *e*, the edges of which are turned up on each side thereof, forming flanges *e'*, which rest on the lower curve of the casing A, said plate being thus adapted to form with the bottom of the casing a compartment, B, which is closed at each end by vertical perforated plates *f f'*. The horizontal plate *e* is extended at its rear end beyond the troughs *a a*, &c., and is provided with a head or flange, which projects upward beyond the bottom of the lower trough. The plate *e* is considerably shorter than the troughs *a*, so that the forward end of the plate does not extend out to the end of the troughs, but rests on the perforated plate *f*, thus forming a pocket or chamber, C, in the forward part of the bottom of the cylinder A. The perforated plate *f'*, which closes the rear end of the compartment B, is placed back some distance from the rear end of the plate *e*, so that a chamber, D, is formed under said plate. From this chamber D leads the water-exit pipe E, said pipe being extended into said chamber some distance above the bottom thereof.

The heater is particularly adapted for use as a live-steam heater—that is, one in which the steam for heating purposes is supplied directly from the boiler. When the heater is so used, a connection is established thereto from the steam-reservoir of the boiler by a pipe, F, which leads into the top of the casing A, the exit-pipe E being connected to the water-inlet of the boiler. A blow-off or discharge pipe, H, is provided, which leads from the chamber C. The compartment B is filled with suitable filtering substance, through which the water is adapted to pass before entering the boiler. The plates $e$, $f$, and $f'$ are all preferably made removable for the purpose of removing or replacing the filtering substance and cleaning the said plates.

When used as a live-steam heater, the casing A is so placed that the bottom thereof stands above the water-line of the boiler.

The operation is as follows: The water is pumped or otherwise forced into the supply-pipe $d$ and falls into the top trough $a$. When the said trough is full, the water flows over the sides thereof, and, following the outer surface of the bottom of the trough, flows in a uniform sheet under the bottom thereof until it reaches the center of the trough, when it drops into the trough below, and so on through each successive trough until it falls on the horizontal plate and flows along said plate into the chamber C. From the chamber C it passes through the filtering-chamber B into the exit-chamber D, and escapes through the exit-pipe E into the boiler. The water, as it passes through each succeeding trough, is brought into direct contact with the steam and becomes thoroughly heated. Each trough remains filled with water, which allows the sediment or impurities held in suspension thereby to fall to the bottom and be retained by the trough. The water, flowing in a uniform sheet under the bottom of the respective troughs and subjected to the direct action of the steam, will part with the lime or other incrustating substances which it contains, the said incrustation being deposited on the under side of the troughs. The pocket or chamber C at the end of the plate $e$ forms a deposit-chamber, into which any sediment not left in the troughs is deposited, and from which it may be discharged by the blow-off H. The exit-pipe E being extended above the bottom of the chamber D prevents any impurities which may be carried through the filter from entering the said pipe.

In my Letters Patent No. 273,084, dated February 27, 1883, I have shown a series of circular bowls placed one above the other and adapted to receive the water, which, when the bowls are full, flows over the edges and under the bottom thereof into the next succeeding bowl; but in that case the effective action of the steam on the water is impaired from the fact that the water increases in volume as it approaches the center of the bowl, owing to the decrease of the surface thereof. In the present device this difficulty is obviated, the water being adapted to flow in a uniform sheet until at or near the center of the trough, when it drops into the next succeeding trough.

It will be seen that by this arrangement the incrustations on the troughs will not detract from the heating capacity of the heater, since the water will always be subjected to the direct action of the steam while flowing down the under side of the troughs. The outer casing, A, I prefer to make of ordinary boiler-iron of a plain cylindrical shape, and provided at each end with annular flanges $A^3$ $A^4$, to which the removable heads $A'$ $A^2$ are secured. Each of the annular flanges $A^3$ $A^4$, I provide on its face with an annular groove, $h$, the heads $A'$ $A^2$ being each provided with a corresponding annular projection, $h'$, adapted to fit therein. In the groove $h$, I place a packing-ring, preferably of rubber, so that when the head is secured thereon a perfect steam-joint is obtained, the packing being at the same time protected from the action of the water and steam thereon. The trough $a$, I make of sheet-steel, the heads or end pieces $b$ being preferably made of malleable iron, whereby a very light and strong construction is obtained, and at the same time a degree of elasticity or resilience secured to the trough which permits the lime or other incrustation to be readily removed therefrom.

It is obvious that the above-described heater may be used as an exhaust-steam heater, if desired, by disconnecting the steam-pipe F, and providing means for passing the exhaust-steam from the engine through the heater, a force-pump being placed in the ordinary manner between the heater and boiler.

Having thus described my invention, I claim—

1. The combination, with an outer shell or casing, of a series of horizontal troughs placed one above another, said troughs being closed at each end, so that the water received therein will flow over the sides thereof and in a uniform sheet under the bottom, substantially as and for the purpose specified.

2. The combination, with the outer casing provided with removable heads, of a series of troughs arranged one above the other and closed at each end by end pieces provided on each side with projections adapted to rest on longitudinal rods or ways in said casing on which said troughs are adapted to slide, substantially as set forth.

3. The combination, with the outer casing and the longitudinal troughs arranged in series one above the other therein, of the longitudinal plate under the said troughs and the vertical perforated plates under said longitudinal plate, whereby a filtering-chamber is formed under said troughs, substantially as specified.

4. The combination, with the horizontal troughs supported on longitudinal rods or ways in a cylindrical casing, of a longitudinal water-supply pipe above said troughs, a longitudinal plate under said troughs provided with a head or flange at the rear, and vertical perforated plates under said longitudinal plate adapted to form therewith a deposit-chamber, a filtering-chamber, and an exit-chamber, substantially as set forth.

5. The combination, with horizontal troughs supported on longitudinal rods or ways in a cylindrical casing and a water-supply pipe above said troughs, of a longitudinal plate under said troughs provided at its rear end with an upwardly-projecting flange and vertical perforated plates under said longitudinal plate adapted to form therewith a deposit-chamber, a filtering-chamber, and an exit-chamber, a discharge-pipe leading from said deposit-chamber, and an exit-pipe leading from said exit-chamber, substantially as specified.

6. The combination, with an outer casing, of a series of troughs adapted to receive a deposit or incrustation from the water passing thereover, said troughs being formed of sheet-steel to secure a degree of resilience, whereby the incrustations may be readily and easily removed therefrom, substantially as set forth.

In testimony whereof I have hereunto set my hand this 14th day of February, A. D. 1885.

JOHN J. HOPPES.

Witnesses:
P. J. CLEVENGER,
PAUL A. STALEY.